(12) United States Patent
Rowe, Sr. et al.

(10) Patent No.: US 8,820,957 B1
(45) Date of Patent: Sep. 2, 2014

(54) LIGHTING DEVICE

(76) Inventors: Kelley Rowe, Sr., Wyckoff, NJ (US);
Colleen Rowe, Wyckoff, NJ (US)

( * ) Notice: Subject to any disclaimer, the term of this patent is extended or adjusted under 35 U.S.C. 154(b) by 183 days.

(21) Appl. No.: 13/448,523

(22) Filed: Apr. 17, 2012

Related U.S. Application Data

(60) Provisional application No. 61/518,299, filed on May 3, 2011.

(51) Int. Cl.
*F21L 4/00* (2006.01)

(52) U.S. Cl.
USPC .................. 362/183; 362/23.03; 362/249.02; 362/362

(58) Field of Classification Search
USPC .......... 362/183, 109, 600, 23.03, 249.02, 362
See application file for complete search history.

(56) References Cited

U.S. PATENT DOCUMENTS

| | | | |
|---|---|---|---|
| 5,815,225 A | 9/1998 | Nelson | |
| 6,161,944 A | 12/2000 | Leman | |
| 6,341,871 B1 | 1/2002 | Angelopoulos | |
| 7,546,114 B1 * | 6/2009 | Glaze, Jr. | 455/410 |
| 7,722,204 B1 * | 5/2010 | Sandberg | 362/92 |
| 2002/0067608 A1 * | 6/2002 | Kruse et al. | 362/109 |
| 2008/0074899 A1 * | 3/2008 | Wang et al. | 362/600 |

* cited by examiner

*Primary Examiner* — Stephen F Husar
*Assistant Examiner* — James Cranson, Jr.
(74) *Attorney, Agent, or Firm* — Emery L. Tracy; Ruth Eure

(57) ABSTRACT

A lighting device for electronic equipment is provided. The electronic device has an outer casing. The lighting device comprises a light mounted to the casing of the electronic equipment wherein the light provides a directed illumination source. The light is recharged when the hand held electronic equipment device is being recharged at the same time using the same recharger.

9 Claims, 2 Drawing Sheets

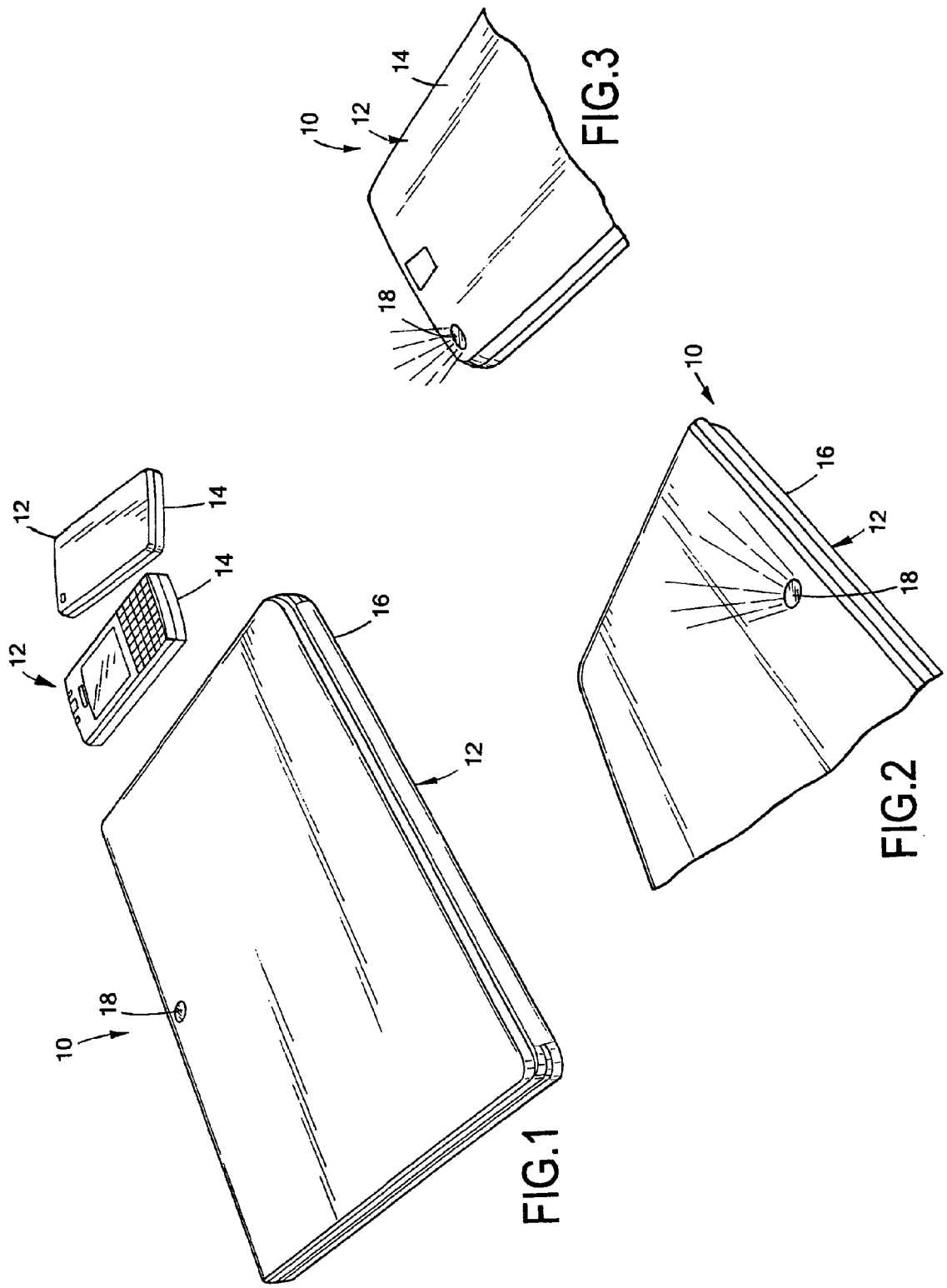

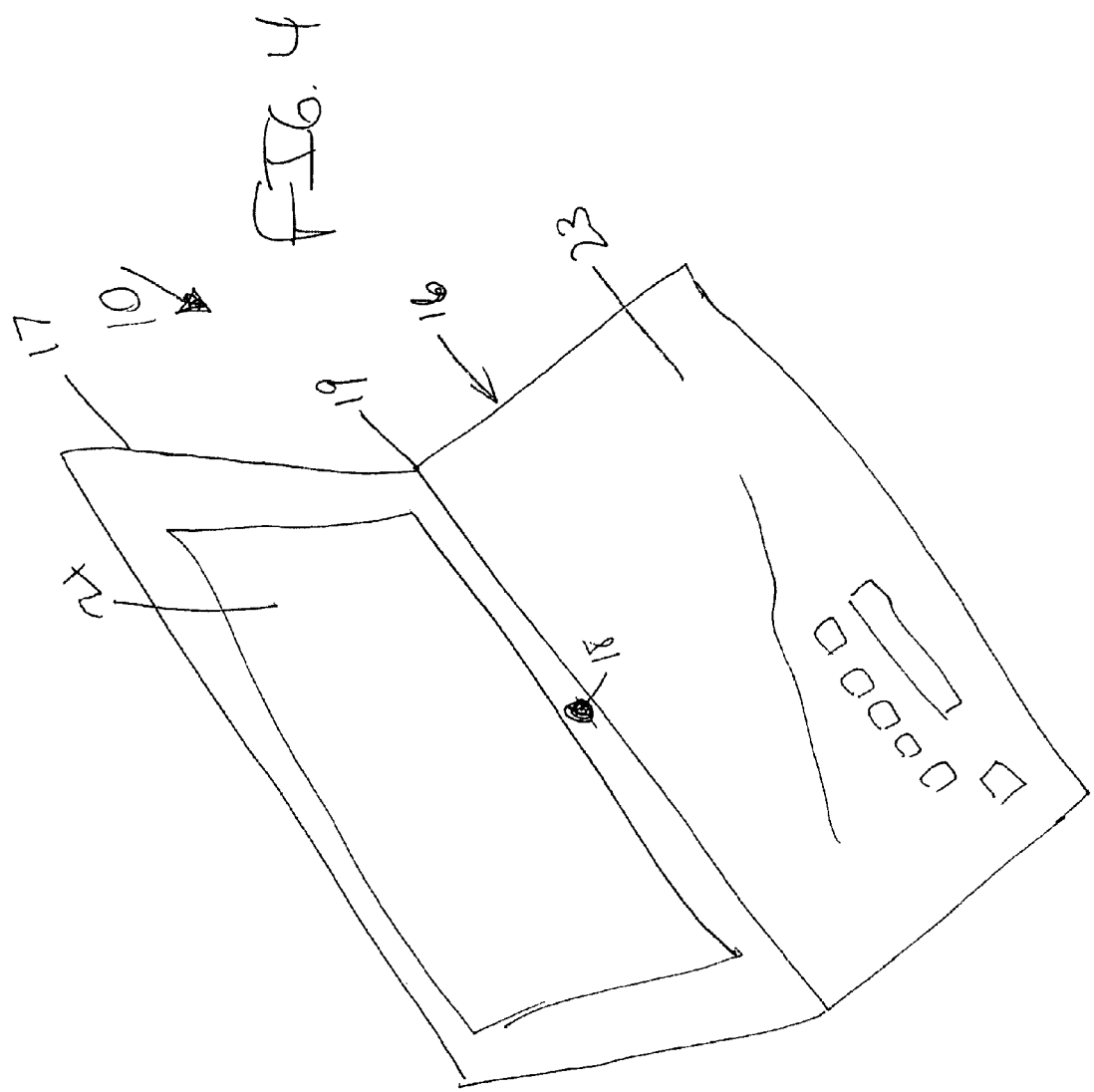

LIGHTING DEVICE

The present application claims the benefit of priority of provisional patent application Ser. No. 61/518,299, filed on May 3, 2011, entitled "Lighting device".

BACKGROUND OF THE INVENTION

1. Field of the Invention

This invention relates generally to a lighting device and, more particularly, the invention relates to a lighting device providing a light for hand held electronic equipment that is rechargeable when all the handheld electronic equipment is recharged at the same time with the same recharger.

2. Description of the Prior Art

The ordinary cellphones, laptops, and hand held electronic devices plus all the functions and applications available for "smartphones" like the iPhone or Blackberry, from checking the weather report to GPS, to Internet browsing, e-mail, driving directions, and restaurant reviews, the smartphone and all the other electronic devices will not help you find your keys in your purse when it's dark, nor will your iPod help you by lighting your way. And, in addition while the laptop computer is nothing short of incredible, the use of this wonder in dim lighting still requires an electric lamp so that you can see the keyboard.

SUMMARY

The present invention is a lighting device for electronic equipment. The electronic device has an outer casing. The lighting device comprises a light mounted to the casing of the electronic equipment wherein the light provides a directed illumination source.

In addition, the present invention includes a lighting device for electronic equipment. The electronic device has an outer casing. The lighting device comprises an LED light mounted to the casing of the electronic equipment wherein the light provides a directed illumination source causing no glare on any display screen mounted on the electronic device. The LED light is recharged at the same time, using the same recharger that recharges all the hand held electronic equipment.

BRIEF DESCRIPTION OF THE DRAWINGS

FIG. 1 are perspective views illustrating a lighting device, constructed in accordance with the present invention, with the lighting device mounted on various electronic equipment;

FIG. 2 is a perspective view illustrating the lighting device, constructed in accordance with the present invention, with the lighting device mounted on a laptop computer near the spine;

FIG. 3 is a perspective view illustrating the lighting device, constructed in accordance with the present invention, with the lighting device mounted on a cellular telephone; and FIG. 4 is a perspective view illustrating another embodiment of the lighting device, constructed in accordance with the present invention.

DETAILED DESCRIPTION OF THE PREFERRED EMBODIMENTS

As illustrated in FIGS. 1-3, the present invention is a lighting device, indicated generally at 10, for providing a light for electronic equipment 12. The lighting device 10 of the present invention is an LED (light-emitting diode) lighting device 10 to be produced in two versions. 1) For cellphones 14, from basic models to full featured smartphones, and all other hand held electronic devices, the lighting device 10 provides a built in flashlight 18. 2) For laptops 16, the lighting device 10 provides a built in two-way double sided LED light 18 preferably positioned on both the exterior side of the laptop cover 17 near the spine 19 providing an LED flashlight 18 and the interior side of the laptop cover 17 below the display screen 21 near the spine 19 opposite the other light 18 for illuminating the keyboard 23 only and avoiding extra glare on the display screen 23 in low light situations.

The lighting device 10 of the present invention is a new feature incorporated into the design and production of cellphones 14, laptop computers 16, and other hand held electronic devices such as MP3 players and the iPod. The positioning of the lighting device 10 provides a flashlight 18 on the exterior side of the cellphone 14 and hand held electronic device 12 that will be helpful in an emergency situation making it easier to communicate information while shining the lighting device 10 on the problem, depending on the existing design and outlay of the specific cellphone 14. This is also true for laptops 16 and hand held electronic devices. For cellphones 14, laptops 16, and hand held electronic devices, the lighting device 10, a small yet bright, easily operated LED light 18 can be positioned so that the light is directed by simple, natural movements of the hand. Plus on the laptop 16 on the interior side of the two-way double sided LED light 18 is a sufficiently bright light to illuminate the keyboard 23 only and not interfere with the user's view of the display screen 21.

The benefits and advantages of the lighting device 10 of the present invention consist of greater user convenience and versatility. Most people spend much time with cellphones 14 and hand held electronic devices in their hands and much of the time at the keyboards of laptops 16. Since cellphones 14, laptops 16, and hand held electronic devices are almost always close at hand, people have no trouble turning to them not only when one wishes to make or answer a call, check e-mail, browse the Internet, or listen to music but also when one needs a pocket flashlight and since there is a flashlight 18 on the cellphone 14, laptop 16, and hand held electronic device there is no need to carry a separate penlight in our purse, briefcase, pocket, or glove-box. With the lighting device 10, people have the convenience and safety of an immediately accessible flashlight and the versatility of a cellphone 14, laptop 16, and hand held flashlight that can help in an emergency situation and even provide more possibilities. Plus, in addition to the convenience of a flashlight 18 on the laptop cover, the two-way double sided LED lighting device 10 on the interior side of the cover below the screen to illuminate the keyboard, there will be no necessity of ambient light, usually in the form of a desk or floor lamp, in order to see the keyboard and wake another person sleeping next to them when traveling or at home. Laptops 16 can be used most anywhere in all lighting situations and the versatility of the two-way double sided lighting device 10 creates an even more efficient self-contained system. The power of the electronic equipment powers the lighting device 10 and is rechargeable at the same time when the electronic equipment is recharged.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein may be suitably practiced in the absence of the specific elements which are disclosed herein.

What is claimed is:

1. A lighting device for electronic equipment, the electronic equipment having an outer casing, the lighting device comprising:
   a first light mounted to the casing of the electronic equipment;
   wherein the electronic equipment is a laptop computer, the laptop computer having a display cover hingedly connected to a keyboard along a spine, the display cover having an outer surface directed away from the keyboard and an inner surface facing the keyboard, the inner surface having a display screen;
   wherein the first light provides a directed illumination source;
   wherein the first light is mounted to the outer surface of the display cover adjacent the spine; and
   wherein the first light is rechargeable when the electronic equipment is recharging.

2. The lighting device of claim 1 wherein the light is an LED (light-emitting diode).

3. The lighting device of claim 1 wherein a second light is mounted to the inner surface of the display cover adjacent the spine, the second light illuminating only the keyboard of the laptop computer.

4. The lighting device of claim 3 wherein the second light causes no glare on the display screen.

5. The lighting device of claim 1 wherein the first light is mounted through the display cover such that the first light extends through the outer surface of the display cover adjacent the spine and the inner surface of the display cover adjacent the spine.

6. The lighting device of claim 1 wherein the first light is directed by natural movements of a hand holding the electronic equipment.

7. A lighting device for electronic equipment, the electronic equipment having an outer casing, the lighting device comprising:
   an LED light mounted to the casing of the electronic equipment;
   a first light mounted to the outer surface of the display cover adjacent the spine; and
   a second light mounted to the inner surface of the display cover adjacent the spine;
   wherein the electronic equipment is a laptop computer, the laptop computer having a display cover hingedly connected to a keyboard along a spine, the display cover having an outer surface directed away from the keyboard and an inner surface facing the keyboard, the inner surface having a display screen;
   wherein the second light illuminates only the keyboard of the laptop computer;
   wherein the lights provide a directed illumination source causing no glare on any display screen mounted on the electronic device; and
   wherein the lights are rechargeable when the electronic equipment is recharging.

8. The lighting device of claim 7 wherein the first light is mounted through the display cover such that the first light extends through the outer surface of the display cover adjacent the spine and the inner surface of the display cover adjacent the spine.

9. The lighting device of claim 7 wherein the light is directed by natural movements of a hand holding the electronic equipment.

* * * * *